(12) United States Patent
Lin

(10) Patent No.: US 11,529,827 B2
(45) Date of Patent: Dec. 20, 2022

(54) TRANSMISSION ASSEMBLY OF A BICYCLE

(71) Applicant: TIEN HSIN INDUSTRIES CO., LTD., Taichung (TW)

(72) Inventor: Shang-Feng Lin, Taichung (TW)

(73) Assignee: TIEN HSIN INDUSTRIES CO., LTD., Taichung (TW)

( * ) Notice: Subject to any disclaimer, the term of this patent is extended or adjusted under 35 U.S.C. 154(b) by 231 days.

(21) Appl. No.: 17/117,129

(22) Filed: Dec. 10, 2020

(65) Prior Publication Data
US 2022/0185013 A1 Jun. 16, 2022

(51) Int. Cl.
*B60B 27/02* (2006.01)
*B60B 27/04* (2006.01)
*B62M 9/10* (2006.01)

(52) U.S. Cl.
CPC .......... *B60B 27/023* (2013.01); *B60B 27/047* (2013.01); *B62M 9/10* (2013.01)

(58) Field of Classification Search
CPC ............ B62M 9/10; B62M 9/12; F16H 55/30
USPC ......................................................... 474/160
See application file for complete search history.

(56) References Cited

U.S. PATENT DOCUMENTS

| | | | |
|---|---|---|---|
| 5,503,600 A * | 4/1996 | Berecz | F16H 55/30 474/160 |
| 5,935,034 A * | 8/1999 | Campagnolo | B62M 9/10 474/160 |
| 5,954,604 A * | 9/1999 | Nakamura | F16G 13/06 474/158 |
| 6,102,821 A * | 8/2000 | Nakamura | B62M 9/10 474/160 |
| 6,264,575 B1 * | 7/2001 | Lim | F16D 41/30 192/64 |
| 6,382,381 B1 * | 5/2002 | Okajima | B60B 1/041 192/64 |
| 6,428,437 B1 * | 8/2002 | Schlanger | B62M 9/12 474/160 |
| 7,959,529 B2 * | 6/2011 | Braedt | B62M 9/10 474/158 |
| 8,100,795 B2 * | 1/2012 | Reiter | B62M 9/10 474/160 |
| 8,956,254 B2 * | 2/2015 | Tokuyama | B62M 9/12 474/160 |
| 10,525,768 B2 * | 1/2020 | Komatsu | B60B 27/023 |
| 11,351,815 B2 * | 6/2022 | Thrash | B60B 27/047 |

(Continued)

*Primary Examiner* — Henry Y Liu

(57) ABSTRACT

A transmission assembly installed on a freehub body of a bicycle is provided. The freehub body rotates about a rotation axis and is provided with a torque transmission portion on a radial outer side. The transmission assembly includes a first adapter having a main body portion connected to the torque transmission portion, a second adapter having a second connecting portion and a pressing portion connected to the second connecting portion, and a friction member. The main body portion is sleeved on the freehub body and includes a first connecting portion having a first thread portion. The second connecting portion has a second thread portion adapted to be screwed to the first thread portion of the first connecting portion. The friction member is disposed in an accommodation space formed by the pressing portion, the radial outer side of the freehub body and one side of the first connecting portion.

12 Claims, 5 Drawing Sheets

(56) References Cited

U.S. PATENT DOCUMENTS

| | | | |
|---|---|---|---|
| 2003/0064844 A1* | 4/2003 | Lin | B62M 9/10 474/158 |
| 2005/0009654 A1* | 1/2005 | Kanehisa | B60B 27/04 474/160 |
| 2008/0188336 A1* | 8/2008 | Tokuyama | B62M 9/10 474/160 |
| 2009/0042679 A1* | 2/2009 | Valle | B62M 9/10 474/160 |
| 2010/0009794 A1* | 1/2010 | Chiang | B62M 9/10 474/160 |
| 2010/0075791 A1* | 3/2010 | Braedt | B62M 9/10 474/160 |
| 2010/0099530 A1* | 4/2010 | Chiang | B62M 9/10 474/160 |
| 2012/0244976 A1* | 9/2012 | Lin | B62M 9/10 474/160 |
| 2012/0302384 A1* | 11/2012 | Braedt | B62M 9/10 474/160 |
| 2012/0322598 A1* | 12/2012 | Lin | B62M 9/10 474/160 |
| 2013/0017914 A1* | 1/2013 | Braedt | B62M 9/10 403/299 |
| 2015/0210353 A1* | 7/2015 | Tokuyama | B62M 9/12 474/160 |
| 2016/0059932 A1* | 3/2016 | Braedt | B62M 9/10 474/160 |
| 2016/0083045 A1* | 3/2016 | Lin | F16H 55/30 474/160 |
| 2016/0114859 A1* | 4/2016 | Tsai | B62M 9/10 474/160 |
| 2016/0200395 A1* | 7/2016 | Braedt | B62M 9/10 403/299 |
| 2017/0057598 A1* | 3/2017 | Thrash | B62M 9/10 |
| 2018/0022416 A1* | 1/2018 | Oishi | B62M 9/12 474/160 |
| 2018/0105229 A1* | 4/2018 | Reinbold | B62M 9/10 |
| 2018/0333986 A1* | 11/2018 | Yuasa | B60B 27/023 |
| 2018/0370598 A1* | 12/2018 | Chang | B62M 9/1248 |
| 2019/0031288 A1* | 1/2019 | Kamada | B62M 9/1242 |
| 2019/0054765 A1* | 2/2019 | Thrash | B60B 27/047 |
| 2019/0126679 A1* | 5/2019 | Komatsu | B60B 27/04 |
| 2019/0127022 A1* | 5/2019 | Komatsu | B62M 9/12 |
| 2020/0062033 A1* | 2/2020 | Bots | F16D 1/10 |
| 2022/0017180 A1* | 1/2022 | Thrash | B60B 27/023 |

* cited by examiner

10

TRANSMISSION ASSEMBLY OF A BICYCLE

FIELD OF THE INVENTION

The present disclosure relates to a bicycle, and more particularly to a transmission assembly of a bicycle.

BACKGROUND OF THE INVENTION

In a rear transmission of a bicycle, a sprocket set is connected with an axle of the rear wheel, and the sprocket set and the axle must be connected by a freehub body. The sprocket set in prior art is fixed to the freehub body by an adapter that can be screwed to the freehub body.

The current adapters usually have a single diameter for penetrating the largest sprocket in the sprocket set. However, the smallest sprocket located at the outermost periphery must also be equipped with an appropriate sprocket. As such, the overall design of the transmission is limited.

In addition, the screw connection position of the adapter and the freehub body is far away from the smallest sprocket, which causes that the adapter may be easily damaged due to that the stress transmission path is too long when the smallest sprocket is used for transmission.

SUMMARY OF THE INVENTION

The present disclosure provides a transmission assembly of a bicycle, in which the size of the sprocket is less affected by the adaptor and therefore has higher durability.

The transmission assembly provided by the present disclosure is used to install on the freehub body of a bicycle. The freehub body is adapted to rotate about a rotation axis and is provided with at least one torque transmission portion on a radial outer side for torque transmission. The transmission assembly includes a first adapter, a second adapter and a friction member. The first adapter includes a main body portion. The main body portion is sleeved on the freehub body and includes a first connecting portion. The first connecting portion has a first thread portion. The main body portion is used to be connected to the torque transmission portion of the freehub body. The second adapter includes a second connecting portion and a pressing portion connected to the second connecting portion. The second connecting portion has a second thread portion. The second thread portion is adapted to be screwed to the first thread portion of the first connecting portion. The pressing portion, the radial outer side of the freehub body and one side of the first connecting portion in a direction of the rotation axis surround to form an accommodation space. The friction member is disposed in the accommodation space. The pressing portion pushes against the friction member when the second adapter is screwed to the first thread portion, so that the friction member is pressed against the second connecting portion and generates a radial force toward the rotation axis by pressing the friction member, thereby fixing the transmission assembly to the freehub body.

In an embodiment of the present disclosure, the second adapter further includes an adapter portion and an operation portion. The adapter portion extends from the pressing portion along the direction of the rotation axis and has an outer diameter smaller than an outer diameter of the pressing portion. The operation portion extends to the adapter portion along the direction of the rotation axis and is located on a side of the freehub body away from a first sprocket set of the transmission assembly and has an operating configuration for installation with tools.

In an embodiment of the present disclosure, an inner diameter of the operation portion is smaller than an inner diameter of the second connecting portion.

In an embodiment of the present disclosure, the main body portion further has a first sprocket connecting portion. The first sprocket connecting portion is provided with the first sprocket set, and the first sprocket set is provided with at least one first sprocket.

In an embodiment of the present disclosure, the aforementioned transmission assembly further includes a sprocket base. One side of the sprocket base is used to fix the first sprocket set.

In an embodiment of the present disclosure, the aforementioned transmission assembly further includes a second sprocket set disposed on the sprocket base. An installation position of the second sprocket set is closer to the operation portion than the first sprocket set.

In an embodiment of the present disclosure, the aforementioned transmission assembly further includes a third sprocket set disposed on the sprocket base and located between the first sprocket set and the second sprocket set.

In an embodiment of the present disclosure, the friction member has a pressure receiving surface, a stopping surface and a pressing surface. The pressure receiving surface is pushed against by the pressing portion of the second adapter. The stopping surface faces the first connecting portion and is pushed against by the first connecting portion. The pressing surface contacts the radial outer side of the freehub body.

In an embodiment of the present disclosure, an angle between the pressure receiving surface or the stopping surface of the friction member and the pressing surface is less than 90°.

In an embodiment of the present disclosure, the friction member has a slit, so that a shape of the friction member can be changed in response to a pushing between the first adapter and the second adapter.

In an embodiment of the present disclosure, the first thread portion is an external thread, and the second thread portion is an internal thread.

In an embodiment of the present disclosure, the first thread portion is an internal thread, and the second thread portion is an external thread.

The transmission assembly of the bicycle in the embodiment of the present disclosure obtains additional radial force for fixing the transmission assembly on the freehub body by pressing the friction member by the first adapter and the second adapter. Because the distance between the friction member and the second sprocket set is less than the distance between the smallest sprocket and the thread portion on the freehub body in the prior art, the torque generated during transmission can be shortened. In addition, the inner diameter of the operation portion of the second adapter is smaller than the inner diameter of the second thread portion, so the size of the second sprocket set is less restricted by the size of the second adapter, and therefore the entire design of the transmission assembly has greater flexibility.

Other objectives, features and advantages of the present disclosure will be further understood from the further technological features disclosed by the embodiments of the present disclosure.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF PREFERRED EMBODIMENTS

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
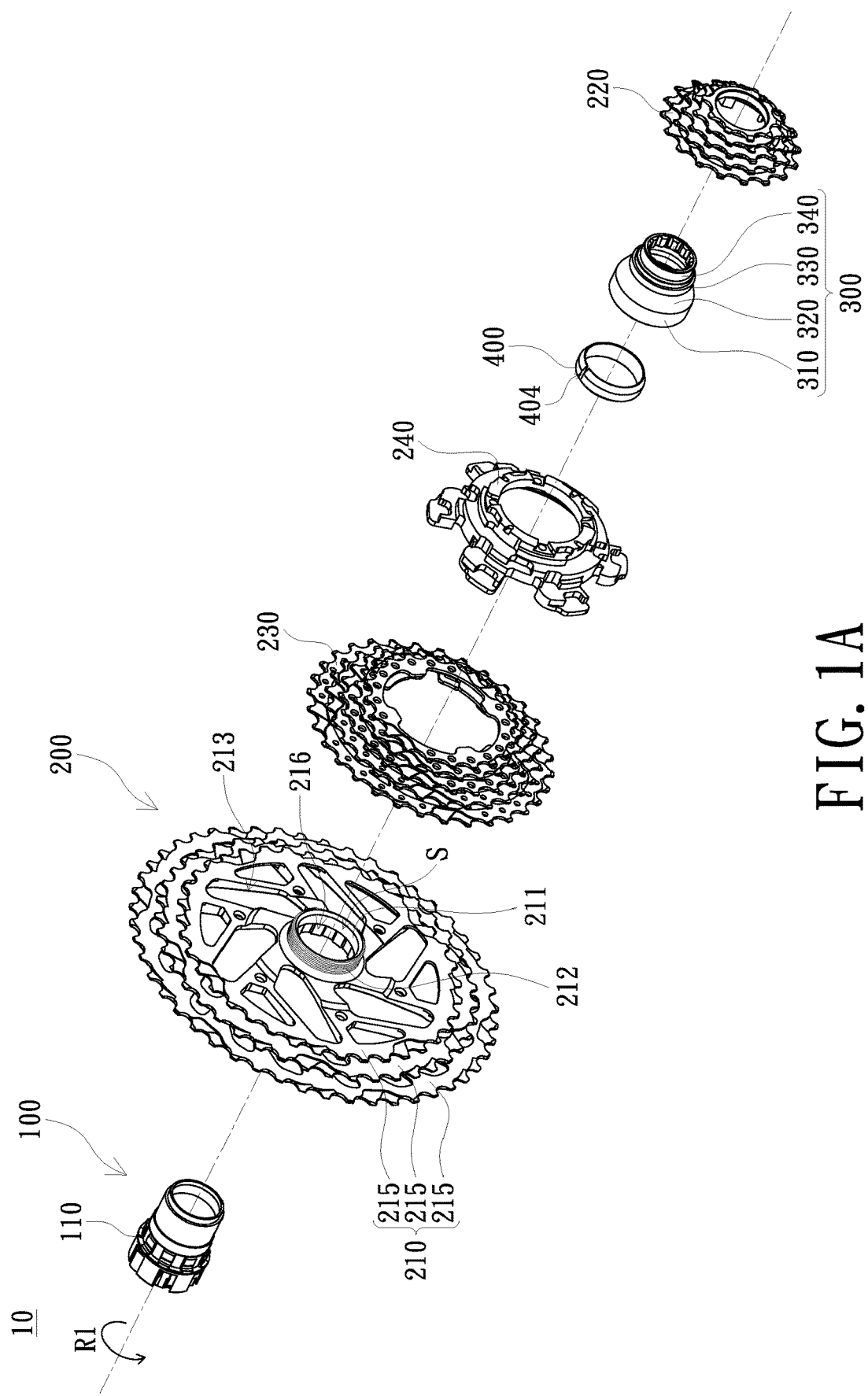
FIG. 1A is an exploded schematic view of a transmission assembly of a bicycle according to an embodiment of the present disclosure.
Figure 1B:
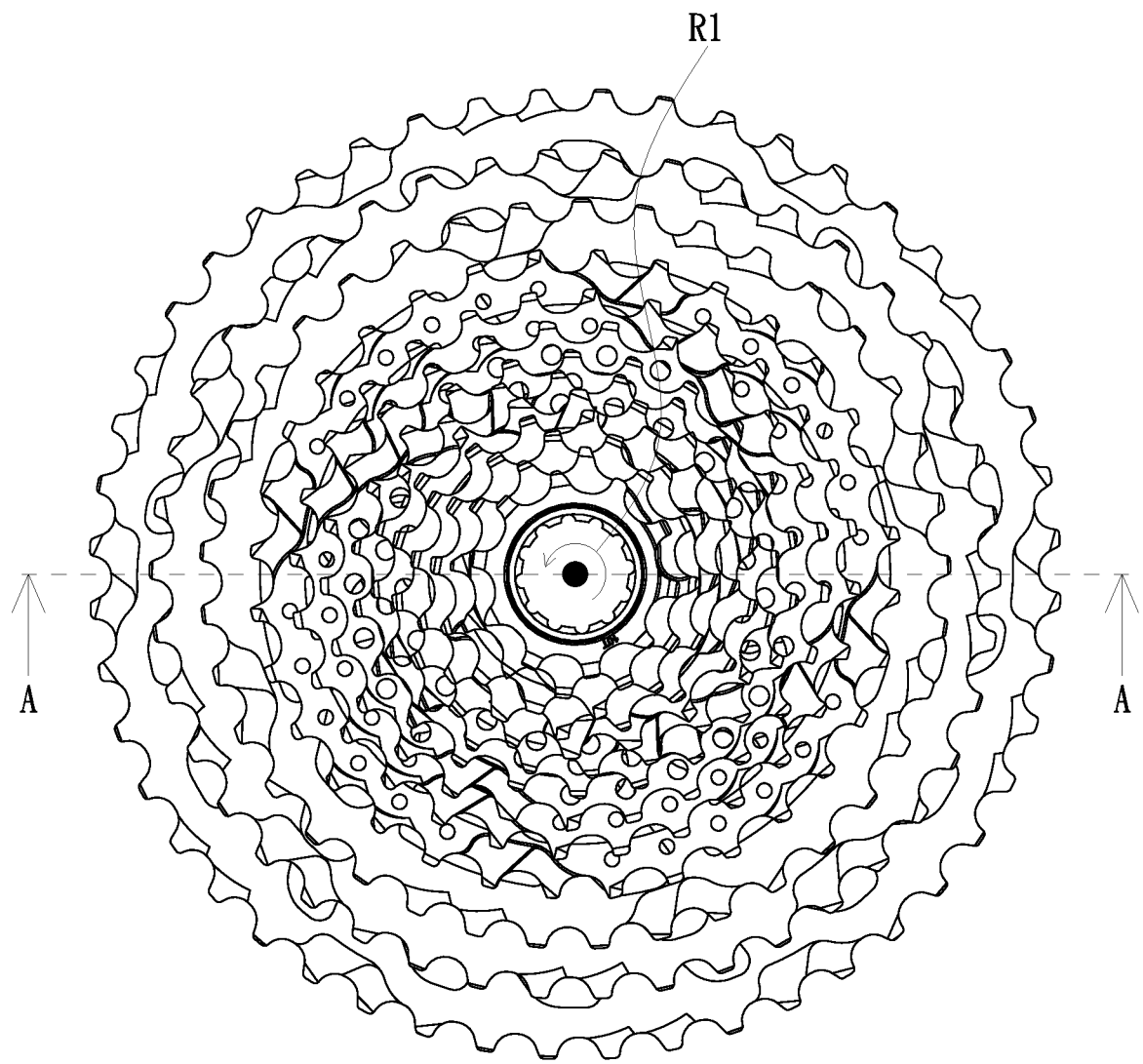
FIG. 1B is a schematic top view of a transmission assembly of a bicycle according to an embodiment of the present disclosure.
Figure 1C:
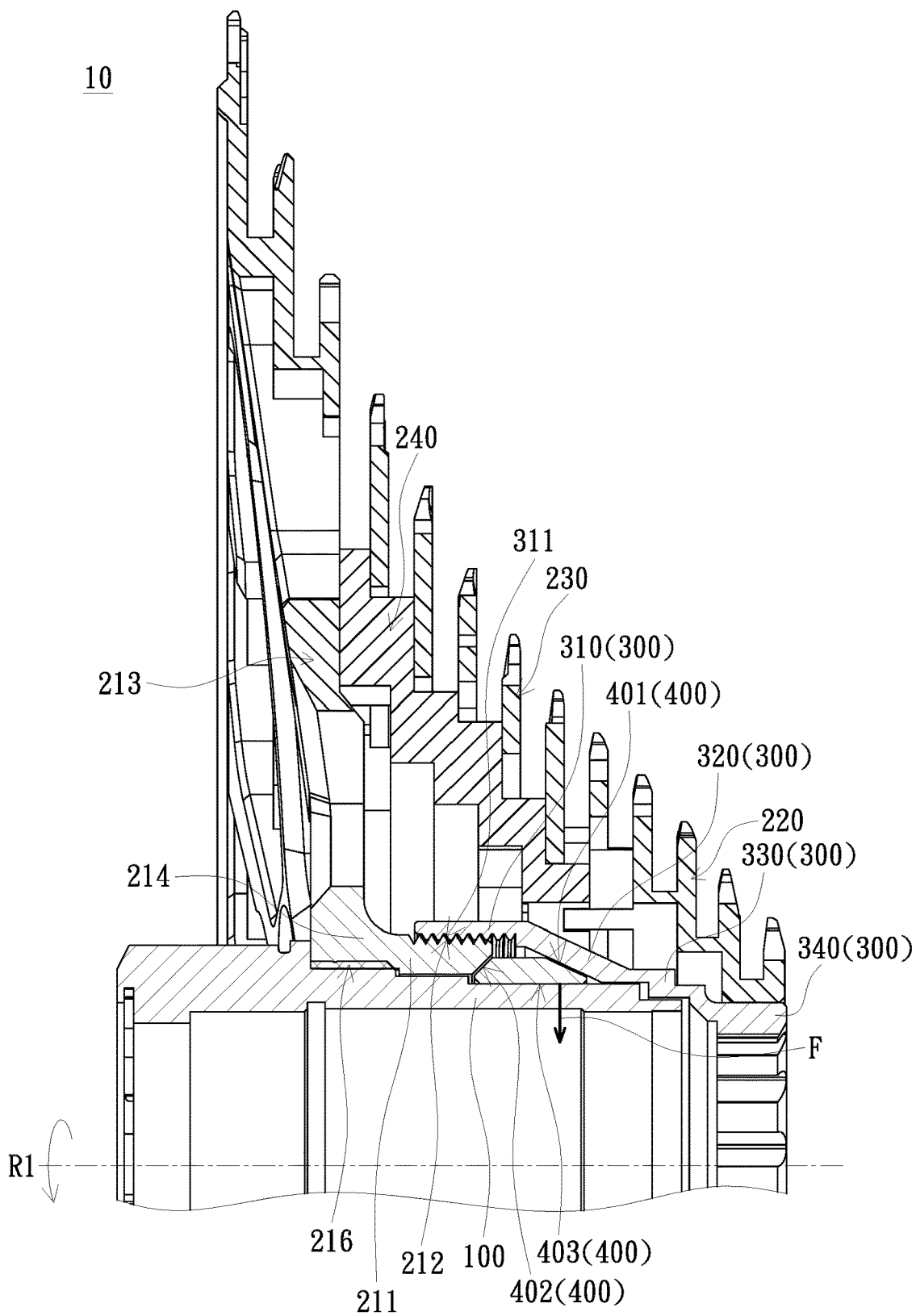
FIG. 1C is a schematic cross-sectional view of the transmission assembly, taken along the line A-A in FIG. 1B.
Figure 1D:
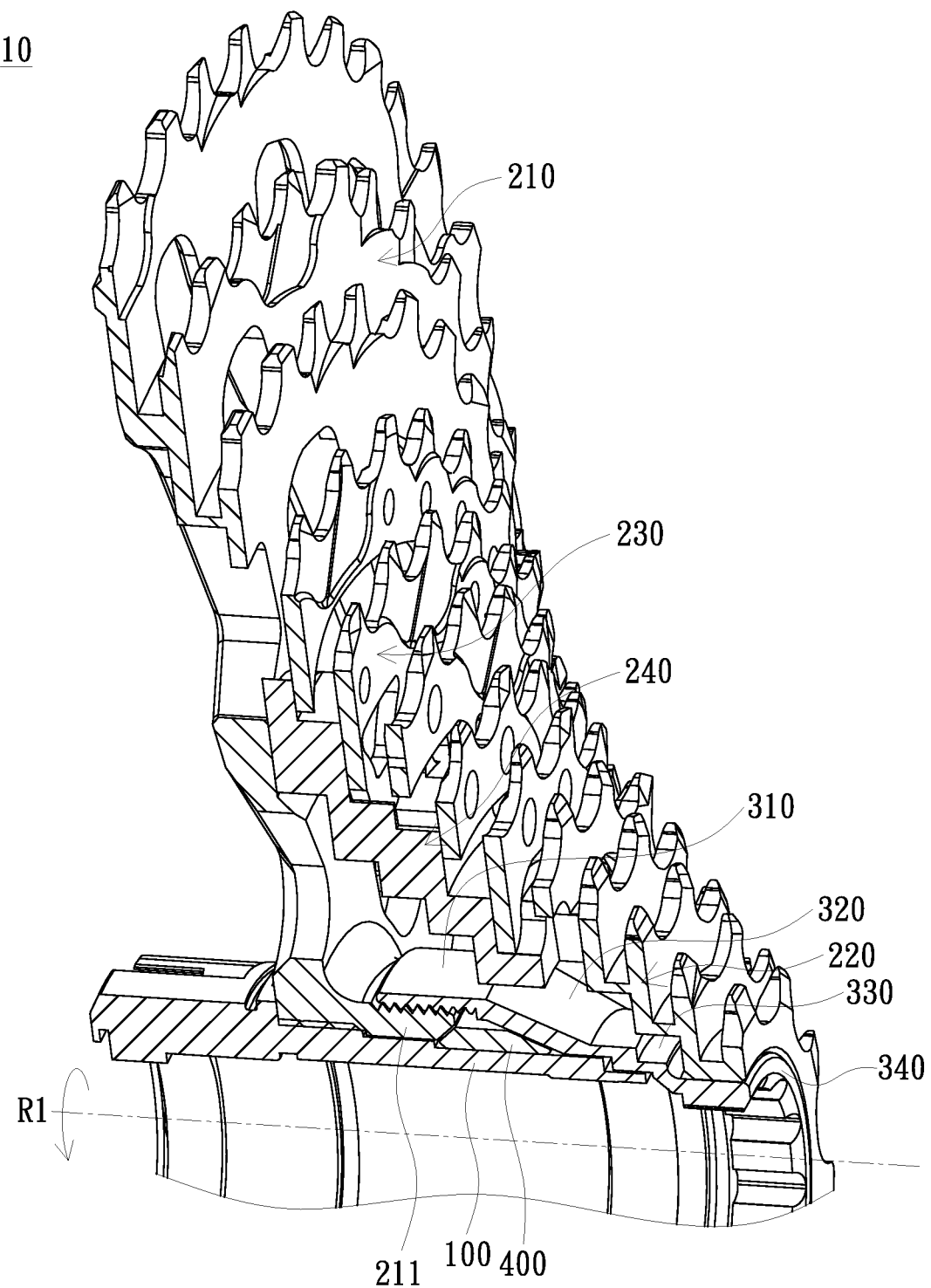
FIG. 1D is a perspective view of FIG. 1C.
Figure 1E:
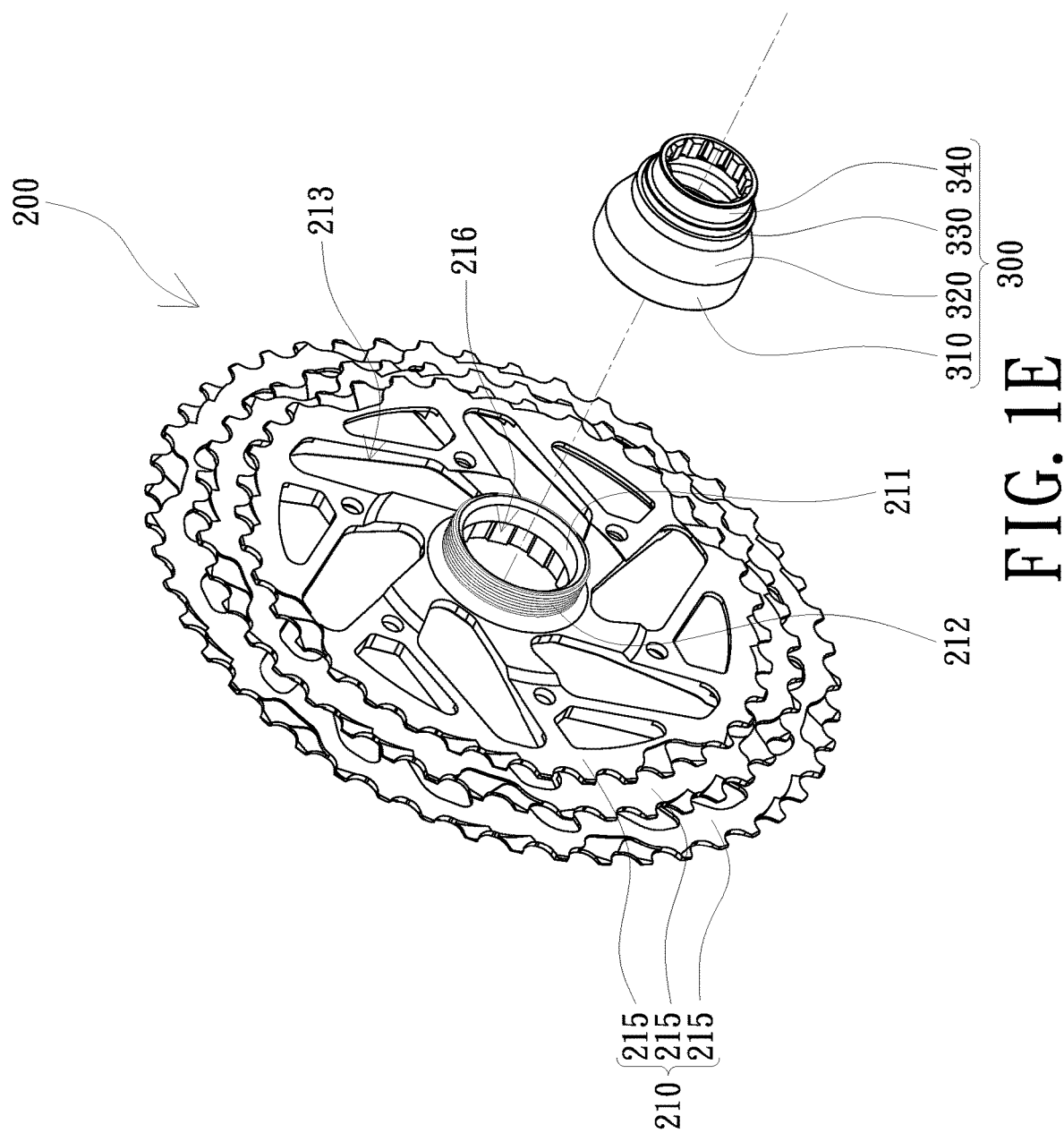
FIG. 1E is an enlarged schematic view of the first adapter and the second adapter of FIG. 1A.

FIG. 1A is an exploded schematic view of a transmission assembly of a bicycle according to an embodiment of the present disclosure. FIG. 1B is a schematic top view of a transmission assembly of a bicycle according to an embodiment of the present disclosure. FIG. 1C is a schematic cross-sectional view of the transmission assembly, taken along the line A-A in FIG. 1B. FIG. 1D is a perspective view of FIG. 1C. FIG. 1E is an enlarged schematic view of the first adapter and the second adapter of FIG. 1A. Please refer to FIGS. 1A to 1E. The transmission assembly 10 of this embodiment includes a freehub body 100, a first adapter 200, a second adapter 300 and a friction member 400.

The freehub body 100 rotates about the rotation axis R1. The freehub body 100 includes a torque transmission portion 110 surrounding the rotation axis R1 on the radial outer side. The freehub body 100 may be a cylinder to be connected with the spindle of the rear wheel of the bicycle (not shown).

The first adapter 200 includes a main body portion 214 and a first connecting portion 211. In this embodiment, the main body portion 214 includes a torque transmission structure 216 and a first sprocket connecting portion 213. The torque transmission structure 216 extends radially to the rotation axis R1 and is connected to the torque transmission portion 110 of the freehub body 100. The first sprocket connecting portion 213 is connected to at least one first sprocket 215. In this embodiment, the first sprocket connecting portion 213 and the first sprocket 215 may be integrally formed, but the disclosure is not limited thereto. In other embodiments not shown, the first sprocket connecting portion 213 and the first sprocket 215 can also be connected by a connecting member, for example, a screw or revet. The main body portion 214 may have a cylindrical structure to be sleeved on the radial outer side of the torque transmission portion 110 of the freehub body 100. The torque transmitting portion 110 and the torque transmitting structure 216 have corresponding concave and convex structures, so that the main body portion 214 and the freehub body 100 are positioned in the rotation direction of the rotation axis R1. The torque transmitting portion 110 may be referred to as a spline portion in the technical field of bicycles. The first connecting portion 211 is provided with a first thread portion 212. The first thread portion 212 may be an external thread and arranged on the radial outer side of the first connecting portion 211; or the first thread portion 212 may be an internal thread and arranged on the radial inner side (not shown) of the first connecting portion 211.

The second adapter 300 may be a cylinder and include a second connecting portion 310 and a pressing portion 320 connected to the second connecting portion 310. The second connecting portion 310 is provided with a second thread portion 311 on the radial inner side to screw the first thread portion 212 of the first connecting portion 211. The pressing portion 320, the radial outer side of the freehub body 100 and one side of the first connecting portion 211 in the direction of the rotation axis R1 surround to form an accommodation space S. The second adapter 300 may further include an adapter portion 330 and an operation portion 340. The adapter portion 330 extends to the pressing portion 320 along the direction of the rotation axis R1 and is adapted to fit on the radial outer side of the freehub body 100. The operation portion 340 extends to the adapter portion 330 along the direction of the rotation axis R1 and is located on the side of the freehub body 100 away from the first sprocket set 210, wherein the first sprocket set 210 includes at least one first sprocket 215.

The friction member 400 has a ring shape and is disposed in the accommodation space S. The friction member 400 has a pressure receiving surface 401, a stopping surface 402, a pressing surface 403 and a slit 404. The pressure receiving surface 401 faces the pressing portion 320 of the second adapter 300. The stopping surface 402 faces the first connecting portion 211. The pressing surface 403 contacts the radial outer side of the freehub body 100. The pressing portion 320 pushes against the pressure receiving surface 401 of the friction member 400 when the second adapter 300 is screwed to the first connecting portion 211 with the second connecting portion 310, so that the stopping surface 402 of the friction member 400 is pressed against the first connecting portion 211 and generates a radial force F toward the rotation axis R1 on the pressing surface 403 by pressing the friction member 400, thereby fixing the transmission assembly 10 on the freehub body 100.

The cylinder diameter of the pressing portion 320 is tapered from the second connecting portion 310 to the adapter portion 330 in the direction of the rotation axis R1, so that the accommodation space S is wedge-shaped in the plane extended from the rotation axis R1, wherein the cross section of the friction member 400 is slightly smaller than the wedge shape of the accommodation space S. The freehub body 100 has a convex step structure on the side away from the first sprocket set 210. The convex step structure tapers closer to the edge. The adapter portion 330 is a convex step structure that conforms to the freehub body 100. The cylinder diameter of the operation portion 340 can be smaller than that of the adapter portion 330. The radial inner side of the operation portion 340 can be a concave-convex surface for connecting with a corresponding tool, so that the user can screw the second adapter 300 to the first connecting portion 211.

The transmission assembly 10 may further include a second sprocket set 220, a third sprocket set 230 and a sprocket base 240. The second sprocket set 220 is sleeved on the radial outer side of the operation portion 340. The third sprocket set 230 is fixed between the second sprocket set 220 and the first sprocket set 210. One side of the sprocket base 240 is used to fix the first sprocket set 210, and the other side is used to fix the second sprocket set 220 and the third sprocket set 230. The first sprocket set 210, the second sprocket set 220 and the third sprocket set 230 can be assembled together by the sprocket base 240. The first sprocket set 210 has the largest size (i.e., the size of the first sprocket 215 is largest), and therefore can be called the largest sprocket set. The second sprocket set 220 has the smallest size, and therefore can be called the smallest sprocket set. The size of the third sprocket set 230 may be between the size of the first sprocket set 210 and the size of the second sprocket set 220.

The transmission assembly of the bicycle in the embodiment of the present disclosure obtains additional radial force for fixing the transmission assembly on the freehub body by pressing the friction member by the first adapter and the second adapter. Because the distance between the friction member and the second sprocket set is less than the distance between the smallest sprocket and the thread portion on the freehub body in the prior art, the torque generated during transmission can be shortened. In addition, the inner diameter of the operation portion of the second adapter is smaller than the inner diameter of the second thread portion, so the size of the second sprocket set is less restricted by the size of the second adapter, and therefore the entire design of the transmission assembly has greater flexibility.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A transmission assembly of a bicycle for being installed on a freehub body of the bicycle, the freehub body being adapted to rotate about a rotation axis and provided with at least one torque transmission portion on a radial outer side for torque transmission, and the transmission assembly comprising:
    a first adapter, comprising a main body portion, wherein the main body portion is sleeved on the freehub body and comprises a first connecting portion, the first connecting portion has a first thread portion, and the main body portion is used to be connected to the torque transmission portion of the freehub body;
    a second adapter, comprising a second connecting portion and a pressing portion connected to the second connecting portion, wherein the second connecting portion has a second thread portion, the second thread portion is adapted to be screwed to the first thread portion of the first connecting portion, and the pressing portion, the radial outer side of the freehub body and one side of the first connecting portion in a direction of the rotation axis surround to form an accommodation space; and
    a friction member, disposed in the accommodation space, wherein, the pressing portion pushes against the friction member when the second adapter is screwed to the first thread portion, so that the friction member is pressed against the second connecting portion and generates a radial force toward the rotation axis by pressing the friction member, thereby fixing the transmission assembly to the freehub body.

2. The transmission assembly of the bicycle according to claim 1, wherein the second adapter further comprises:
    an adapter portion, extending from the pressing portion along the direction of the rotation axis and having an outer diameter smaller than an outer diameter of the pressing portion; and
    an operation portion, extending to the adapter portion along the direction of the rotation axis and located on a side of the freehub body away from a first sprocket set of the transmission assembly and having an operating configuration for installation with tools.

3. The transmission assembly of the bicycle according to claim 2, wherein an inner diameter of the operation portion is smaller than an inner diameter of the second connecting portion.

4. The transmission assembly of the bicycle according to claim 2, wherein the main body portion further has a first sprocket connecting portion, the first sprocket connecting portion is provided with the first sprocket set, and the first sprocket set is provided with at least one first sprocket.

5. The transmission assembly of the bicycle according to claim 4, further comprising a sprocket base, and one side of the sprocket base is used to fix the first sprocket set.

6. The transmission assembly of the bicycle according to claim 5, further comprising a second sprocket set disposed on the sprocket base, wherein an installation position of the second sprocket set is closer to the operation portion than the first sprocket set.

7. The transmission assembly of the bicycle according to claim 6, further comprising a third sprocket set disposed on the sprocket base and located between the first sprocket set and the second sprocket set.

8. The transmission assembly of the bicycle according to claim 1, wherein the friction member having:
    a pressure receiving surface, pushed against by the pressing portion of the second adapter;
    a stopping surface, facing the first connecting portion and pushed against by the first connecting portion; and
    a pressing surface, contacting the radial outer side of the freehub body.

9. The transmission assembly of the bicycle according to claim 8, wherein an angle between the pressure receiving surface or the stopping surface of the friction member and the pressing surface is less than 90°.

10. The transmission assembly of the bicycle according to claim 1, wherein the friction member has a slit, so that a shape of the friction member can be changed in response to a pushing of the first adapter or the second adapter.

11. The transmission assembly of the bicycle according to claim 1, wherein the first thread portion is an external thread, and the second thread portion is an internal thread.

12. The transmission assembly of the bicycle according to claim 1, wherein the first thread portion is an internal thread, and the second thread portion is an external thread.

* * * * *